2,925,446
FLUORINATED INTERNAL OLEFINS AND THEIR PREPARATION

John J. Drysdale, Wilmington, Del., assignor to E. I. du Pont de Nemours and Company, Wilmington, Del., a corporation of Delaware No Drawing. Application June 16, 1958
Serial No. 742,062

16 Claims. (Cl. 260—653.3)

This invention relates to highly fluorinated organic compounds. More particularly, it relates to highly fluorinated olefins and to a method for their preparation.

Some fluorinated olefins having the ethylenic double bond in the 1- or 2-position, i.e., where the ethylenic double bond is between the first and second, or between the second and third carbons of the olefin, and methods for preparing them are known. However, a general method for making highly fluorinated internal olefins in which the ethylenic bond is on a carbon more than one carbon away from the terminal carbon of the olefin is not known. In view of the potential interest in such internally unsaturated fluoroolefins, objects of this invention are, therefore, to provide a new class of such olefins and to provide a general method of making the same.

Pursuant to the above-mentioned and yet other objects, a general synthesis of highly fluorinated olefins having the ethylenic bonds on carbons other than the terminal carbons of the olefin is now provided. This novel synthesis comprises heating a fluoroacyl halide of the formula

where R is any organic radical inert to nickel carbonyl, and X is a halogen having atomic number of at least 17, i.e., chlorine, bromine and iodine, with nickel carbonyl at a temperature between 40° and 200° C. An especially preferred embodiment of the process of this invention comprises heating a perfluoroacyl halide, an ω-hydroperfluoroacyl halide, or an ω-chloroperfluoroacyl halide of the general formula

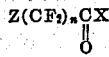

wherein Z is hydrogen, fluorine or chlorine, $n$ is an integer between 2 and 20, inclusive, and X is chlorine, bromine or iodine, with nickel carbonyl at a temperature of 40°–200° C. It will be noted that $Z(CF_2)_{n-1}$ of the preferred embodiment corresponds to R, above.

The process described is illustrated by the following equation showing the reaction of 7-hydroperfluoroheptanoyl chloride with nickel carbonyl:

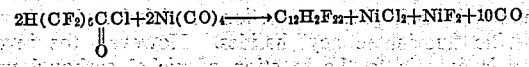

The position of the double bond in the fluorinated olefin is left undefined in this equation since more than one isomer may be obtained; however, all are internal olefins.
The fluorinated internal olefins of the formulas

and
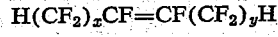

wherein $x$ and $y$ are integers between 1 and 19, inclusive, are novel and also a part of this invention.

The process of this invention can be carried out in a closed reaction system under the autogenous pressure developed under reaction conditions or it can be carried out under reflux conditions at atmospheric pressure.

In the embodiment of this invention where the reaction is carried out in a closed system, the process is conveniently carried out by placing in a reaction vessel capable of withstanding the pressure developed by the reaction mixture under the operating conditions a fluoroacyl halide of the general formula given above or a mixture of such fluoroacyl halides and at least one equivalent of nickel carbonyl and then heating the reaction mixture at 100°–200° C., preferably at 125°–175° C.

Reaction times are not critical, at autogenous pressure times ranging from 4 hours or less to 16 hours or more being satisfactory. In general, the longer times of reaction are employed when the lower operating temperatures in the above specified ranges are used. After reaction is completed, as evidenced by no further pressure increase, the reactor and reaction mixture are cooled, the pressure in the reactor is released, and the reactor is then subjected to reduced pressure to remove volatile compounds. The residual high boiling liquids and solids are removed from the reaction vessel and are added to an excess of water, whereupon a fluorocarbon layer separates from the aqueous layer. The fluorocarbon layer is washed with aqueous sodium carbonate and is then fractionally distilled to isolate the fluoroolefin.

In the atmospheric pressure embodiment of the process of this invention, which is preferred when fluoroacyl halides boiling above 40° C. are employed, the reaction between the fluoroacyl halide, or mixture of fluoroacyl halides, and nickel carbonyl is carried out as follows: The fluoroacyl halide and the nickel carbonyl are placed in a reaction vessel fitted with a water-cooled reflux condenser, the outlet of which is connected to a trap cooled by solid carbon dioxide in order to collect any nickel carbonyl which distills through the water-cooled condenser. Optionally, the reflux condenser can be cooled to about −20° C. and in this case a cold trap is not needed. The exit of the cold trap is connected to a bubble tube to provide means for observing the rate of formation of carbon monoxide which passes through the cold trap.

When high boiling fluoroacyl halides are being employed, it is convenient to use an inert fluorocarbon, e.g., 1,1,2-trichloro-1,2,2-trifluoroethane as a solvent in order to lower the reflux temperature of the reaction mixture. The proportions of fluoroacyl halide and nickel carbonyl are not critical. However, if it is desired to use up all the fluoroacyl halide, it is preferred to use one mole of nickel carbonyl for each mole of fluoroacyl halide.

The reaction mixture is heated to reflux temperature, preferably at a temperature between 50 and 150° C. until evolution of carbon monoxide ceases. The time required to complete the reaction under these conditions depends on the particular operating temperature being employed. For example, at temperatures of 60–80° C. reaction is usually completed in one hour or less. If desired, the heating can be interrupted to replace in the reaction vessel any nickel carbonyl that distills through the water-cooled condenser into the cold trap. After the reaction is completed, the nickel chloride precipitate which forms is filtered from the reaction mixture and dissolved in water. Any fluorocarbon that separates from the aqueous nickel chloride solution is separated and combined with the filtrate from the reaction mixture. The crude fluorocarbon reaction product is then fractionally distilled to isolate the fluoroolefins that are formed.

The fluoroacyl halides used as starting materials in the process of this invention can be made from the corresponding fluoroalkanoic acids by treatment with halogenating agents, e.g., thionyl chloride and phosphorus tribromide, or by reaction of the acyl chloride with calcium iodide. A detailed description of the preparation of polyfluoroalkanoic acids and their conversion to acyl halides is given in U.S. Patents 2,559,629 and 2,559,630. The ω-chloroperfluoroalkanoic acids can be prepared as described in U.S. Patent 2,790,815, and their conversion to the acid halides can be carried out by the methods described above.

The invention is illustrated in further detail by the following examples in which the proportions of ingredients are expressed in parts by weight unless otherwise specified.

Example I

A stainless steel reaction vessel capable of withstanding high pressure is charged with 73 parts of 7-hydroperfluoroheptanoyl chloride and 34 parts of nickel carbonyl and heated at 130° C. with agitation for 4 hours. The reaction vessel is then cooled, evacuated with a vacuum pump to a pressure of approximately 1-2 mm. of mercury to remove the low boiling compounds, and the residual high boiling liquids and solids are removed and agitated wtih 100 parts of water. The lower fluorocarbon layer which forms is separated from the aqueous layer and is washed with aqueous sodium carbonate solution and then distilled under reduced pressure. There is obtained a 50% conversion (70-80% yield) of a mixture of 1,12 - dihydroperfluoro - 5 - dodecene, 1,12 - dihydroperfluoro-6-dodecene, and 1,12-dihydroperfluorododecane; boiling point 48-70° C./0.5 mm. Nuclear magnetic resonance analyses of all fractions of this product are consistent with a mixture of the saturated and unsaturated fluorocarbons.

Example II

A stainless steel pressure vessel is charged with 51 parts of nickel carbonyl and 69 parts of perfluorobutyryl chloride and heated at 150° C. with agitation for 8 hours. After cooling, the reaction mixture is pumped from the reaction vessel into a trap chilled by a mixture of solid carbon dioxide and acetone and is then fractionally distilled at atmospheric pressure. The following fractions are obtained:

| Fraction | B.P., °C. | Amount, Parts by Weight |
| --- | --- | --- |
| 1 | 37-42 | 5 |
| 2 | 42 | 5 |
| 3 | 42 | 5 |
| 4 | 42-49 | 5 |
| 5 | 49-53 | 5 |
| 6 | 53-70 | 1 |
| 7 | 70-72 | 5 |
| 8 | 72-86 | 1 |
| 9 | 86 | 2 |
| Residue | | 10 |

Nickel carbonyl codistills with the reaction products in fractions 1-7 and is removed by gas chromatography. Fractions 4 and 5 are a mixture of perfluoro-3-hexene, perfluoro-2-hexene, and perfluorohexane. Fraction 7 is principally perfluoro - 4 - heptanone. The structures of these products are assigned on the basis of nuclear magnetic resonance analyses and for fraction 7 by its gas chromatographic analysis.

Example III

A stainless steel pressure vessel is charged with 13 parts of 11-hydroperfluoroundecanoyl chloride, 23 parts of perfluorobutyryl chloride and 40 parts of nickel carbonyl, and is heated at 150° C. with agitation for 16 hours. After cooling, the reaction product is removed from the reaction vessel and is shaken with 100 parts of water and the lower organic layer is then fractionally distilled. There is obtained a mixture of 13 - hydroperfluoro-3-tridecene, 13-hydroperfluoro-2-tridecene, and 1-hydroperfluorotridecane, boiling at 82-96° C./10 mm., amounting to 6 parts, corresponding to a yield of 40%. There is also obtained 2 parts (corresponding to a yield of 15%) of 1,20-dihydroperfluoro-10-eicosene, melting at 89-91° C. These products are identified by nuclear magnetic resonance analyses and the latter by elemental analysis.

*Analysis.*—Calc'd. for $C_{20}F_{38}H_2$: C, 24.92%; H, 0.42%; F, 74.66%. Found: C, 25.25%; H, 0.67%; F, 74.31%.

Example IV

Using the reaction conditions described in Example III, 74 parts of 5-hydroperfluorovaleryl chloride and 51 parts of nickel carbonyl are reacted. There are isolated from the reaction mixture 1,8-dihydroperfluoro-4-octene, 1,8-dihydroperfluoro - 3 - octene, 1,9 - dihydroperfluoro - 5-nonanone, and 1,8-dihydroperfluorooctane. These products are identified by nuclear magnetic resonance analyses.

The procedure of Example IV is repeated 13 times and reaction products are combined. The combined reaction products are agitated with water and the water-insoluble portion is then agitated with aqueous sodium hydroxide solution to destroy the ketone present. The lower organic layer is then distilled and there is obtained 125 parts of product boiling at 126-130° C. at atmospheric pressure. Nuclear magnetic resonance analyses show this product is a mixture comprised of the octenes 1,8-dihydroperfluoro-4-octene and 1,8-dihydroperfluoro-3-octene (80%) and 1,8-dihydroperfluorooctane (20%).

Example V

A reaction vessel fitted with a reflux condenser, the outlet of which is connected in turn to a trap cooled by solid carbon dioxide and then to a bubble tube, is charged with 90 parts of 5-hydroperfluorovaleryl chloride and 40 parts of nickel carbonyl. The reaction mixture is heated to reflux temperature (60° C.) whereupon carbon monoxide is evolved and nickel chloride precipitates. Refluxing is continued for about one-half hour during which time the temperature of the reaction mixture reaches 80° C. The reaction vessel and its contents are cooled to 25° C., the nickel carbonyl collected in the cold trap is replaced in the reaction vessel, and the heating cycle is repeated. After about 15 minutes at reflux temperature, no more carbon monoxide passes through the bubble tube and this indicates that the reaction is complete. The reaction mixture is cooled and filtered. The nickel chloride precipitate is dissolved in water and the lower fluorocarbon layer that separates from the aqueous solution of nickel chloride is separated and combined with the filtrate from the reaction mixture. Distillation of the fluorocarbon product gives 18 parts, corresponding to a 33% conversion and 75% yield, of a mixture of 1,8-dihydroperfluoro-3-octene and 1,8-dihydroperfluoro-4-octene, boiling at 127-129° C. Nuclear magnetic resonance analysis indicates that these two fluoroolefins are present in approximately equal proportions.

The examples have illustrated the process of this invention by reference to reaction of nickel carbonyl with specific fluorinated acyl halides. However, the invention is generic to the reaction of nickel carbonyl with any fluoroacyl halide of the formula

RCF₂CX
  ‖
  O wherein R is any organic radical which is inert to nickel carbonyl and X is chlorine, bromine or iodine. Thus, when the fluoroacyl halides listed in the first column of the following table are reacted with nickel carbonyl under the conditions defined hereinbefore, the specific internal fluoroolefins listed in the second column of the following table are obtained.

| Fluoroacyl Halide Reactant | Internal Fluoroolefin Products |
|---|---|
| 3-Hydroperfluoropropionyl chloride. | 1,4-Dihydroperfluoro-2-butene. |
| Perfluorooctanoyl bromide | Perfluoro-7-tetradecene and perfluoro-6-tetradecene. |
| 21-Hydroperfluoroheneicosanoyl chloride. | 1,40 - Dihydroxyperfluoro - 20 - tetracontene and 1,40-dihydroxyperfluoro-19-tetracontene. |
| 3-Hydroperfluoropropionyl iodide | 1,4-Dihydroperfluoro-2-butene. |
| 5-Chloroperfluorovaleryl chloride | 1,8-Dichloroperfluoro-4-octene and 1,8-dichloroperfluoro-3-octene. |
| 9-Chloroperfluorononanyl chloride. | 1,16-Dichloroperfluoro-8-hexadecene and 1,16-dichloroperfluoro-7-hexadecene. |
| Perfluorosuccinyl fluoro chloride | Perfluoro-3-hexenedicarboxylic acid fluoride and perfluoro-2-hexenedicarboxylic acid fluoride. |
| Perfluoroglutaryl fluoro chloride | Perfluoro-4-octenedicarboxylic acid fluoride and perfluoro-3-octenedicarboxylic acid fluoride. |
| Perfluoroadipyl fluoro chloride | Perfluoro-5-decenedicarboxylic acid fluoride and perfluoro-4-decenedicarboxylic acid fluoride. |

In addition to internal fluoroolefins, the process of this invention also yields fluoroketones. The simultaneous formation of fluoroketones along with the fluoroolefins has been illustrated in Examples II and IV. In general, the proportions of the internal fluoroolefins are increased by using a large excess of nickel carbonyl, while the proportions of the fluoroketones are increased by using equimolar amounts of nickel carbonyl and the fluoroacy halide. The dihydroperfluoroketones are claimed in U.S. application Serial No. 730,281, filed April 23, 1958, by H. E. Simmons, Jr., where they are made by a different method.

The internal fluoroolefins of this invention are useful as solvents for perfluoroketones, perfluoroacids, low-melting polytetrafluoroethylene, and the like. They are especially useful as solvents for the polyfluoro telomer alcohols described in U.S. Patent 2,559,628. For example, the telomer alcohol of formula $$H(CF_2CF_2)_8CH_2OH$$

prepared from tetrafluoroethylene and methanol, can be dissolved at a concentration of 5% in a warm mixture of 1,8 - dihydroperfluoro - 3 - octene, 1,8 - dihydroperfluoro-4-octene, and 1,8-dihydroperfluorooctane, prepared as described in Example IV. The resulting solution can be applied to the surface of a wood or metal object and the solvent then evaporated to leave a layer of the solid telomer alcohol on the surface of the object as a lubricant.

The instant novel fluoroefins are also useful as chemical intermediates. They can be oxidized, for example, to form fluorocarboxylic acids useful in many applications. A specific illustration of this oxidation is the reaction of 1,8-dihydroperfluoro-4-octene with potassium permanganate. When this fluoroolefin is treated with an aqueous solution of potassium permanganate at reflux temperature, it yields ω-hydroperfluorobutyric acid.

Since obvious modifications in the invention will be evident to those skilled in the chemical arts, I propose to be bound solely by the appended claims.

The embodiments of the invention in which an exclusive property or privilege is claimed are defined as follows:

1. A fluorinated internal olefin of the group consisting of $H(CF_2)_xCF=CFC_yF_{2y+1}$ and $$H(CF_2)_xCF=CF(CF_2)_yH$$

wherein $x$ and $y$ are integers between 1 and 19, inclusive.
2. 1,12-dihydroperfluoro-5-dodecene.
3. 13-hydroperfluoro-3-tridecene.
4. 13-hydroperfluoro-2-tridecene.
5. 1,8-dihydroperfluoro-4-octene.
6. 1,8-dihydroperfluoro-3-octene.
7. The process which comprises heating a fluoroacyl halide of the formula $$RCF_2CX\underset{\|}{\overset{}{O}}$$

wherein R is an organic radical inert to nickel carbonyl and X is halogen of an atomic number of at least 17, with nickel carbonyl at a temperature of about 40–200° C.
8. The process of claim 7 wherein R is perfluorinated and contains 1–19 carbons.
9. The process of claim 7 wherein R carries a member of the group consisting of hydrogen and chlorine on the carbon omega to the attached carbonyl group but is otherwise perfluorinated and contains 1–19 carbons.
10. The process of claim 7 accomplished under superatmospheric pressure.
11. The process of claim 10 wherein the pressure is autogenous.
12. The process of claim 7 accomplished with reflux at atmospheric pressure.
13. The process of heating 7-hydroperfluoroheptanoyl chloride with nickel carbonyl at 40–200° C.
14. The process of heating perfluorobutyryl chloride with nickel carbonyl at 40–200° C.
15. The process of heating 11-hydroperfluoroundecanoyl chloride with nickel carbonyl at 40–200° C.
16. The process of heating 5-hydroperfluorovaleryl chloride with nickel carbonyl at 40–200° C.

References Cited in the file of this patent

FOREIGN PATENTS 504,950    Canada _____ Aug. 10, 1954

OTHER REFERENCES

Henne et al.: Jour. Am. Chem. Soc., 73, 5527 (1951).
Slesser et al.: Preparation, Properties, and Technology of Fluorine and Organic Fluoro Compounds, page 837, 1951, McGraw-Hill Book Co., Inc., New York.
Haszeldine et al.: Jour. Chem. Soc., 1953, page 1592.
Simons: Fluorine Chemistry, vol. II, page 412, 1954, Academic Press Inc., New York.